Feb. 2, 1932. A. L. EMENS 1,843,387
ELECTRICITY METER
Filed Jan. 11, 1929 2 Sheets-Sheet 1

Inventor:
Albert L. Emens
By ...... Atty.

Feb. 2, 1932.    A. L. EMENS    1,843,387
ELECTRICITY METER
Filed Jan. 11, 1929    2 Sheets-Sheet 2
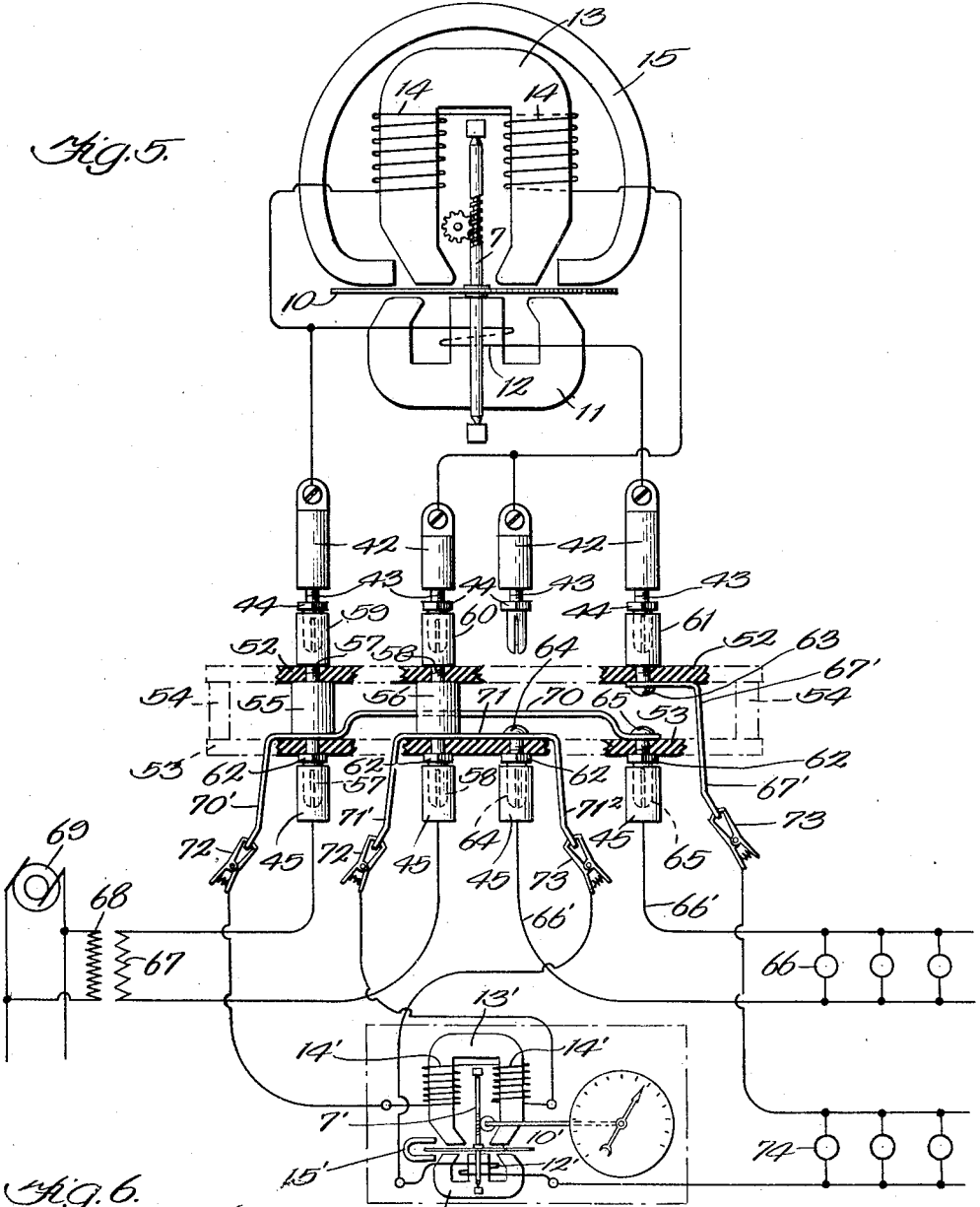

Patented Feb. 2, 1932

1,843,387

UNITED STATES PATENT OFFICE

ALBERT L. EMENS, OF LA FAYETTE, INDIANA, ASSIGNOR TO DUNCAN ELECTRIC MANUFACTURING COMPANY, OF LA FAYETTE, INDIANA, A CORPORATION OF ILLINOIS

ELECTRICITY METER

Application filed January 11, 1929. Serial No. 331,733.

My invention relates to electricity meters and has for its general object the provision of means whereby a standardized testing meter may be connected with a service meter and the source of current which supplies the load circuit with which the service meter is associated, provision being made whereby the testing meter and service meter may be coupled without interrupting the supply of current to the load.

In carrying out my invention I employ an adapter which is interposable between terminals of the meter magnet windings and terminals of the load circuit and which is equipped with bridges or jumpers whereby the load circuit is maintained intact in the process of and during connection of the standardized testing meter with the service meter and the source of current that supplies the normal load circuit. In the preferred embodiment of the invention the normal load does not have connection with the standardized testing meter and is disconnected from the service meter during the testing operation. A special or artificial load of accurately determined values is coupled with both meters, in place of the commercial or normal load, during the testing operation. The windings of the testing meter and the artificial load circuit are provided with terminals which are readily applicable to complemental terminals or contacts that are provided upon the adapter.

Figure 1:
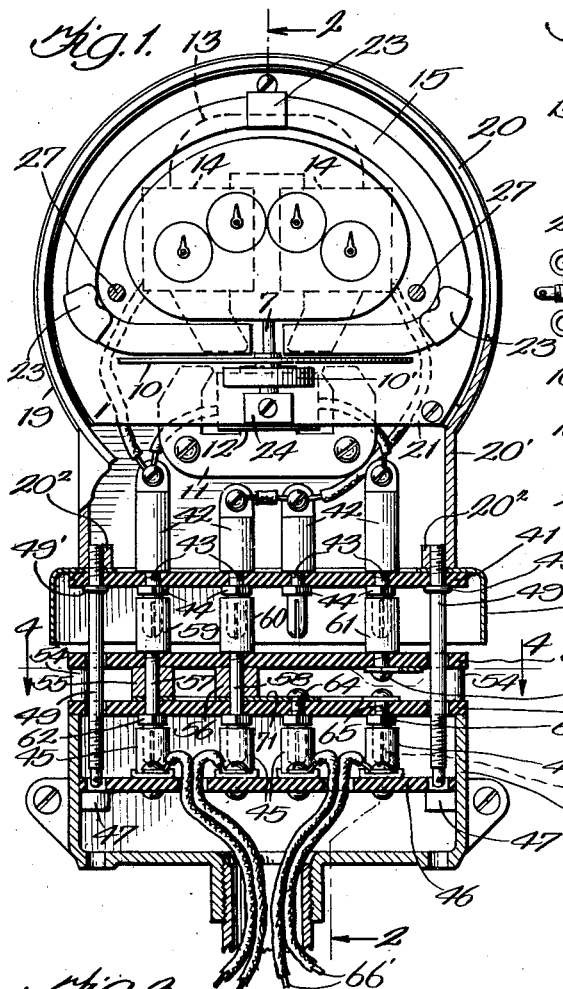
Figure 2:
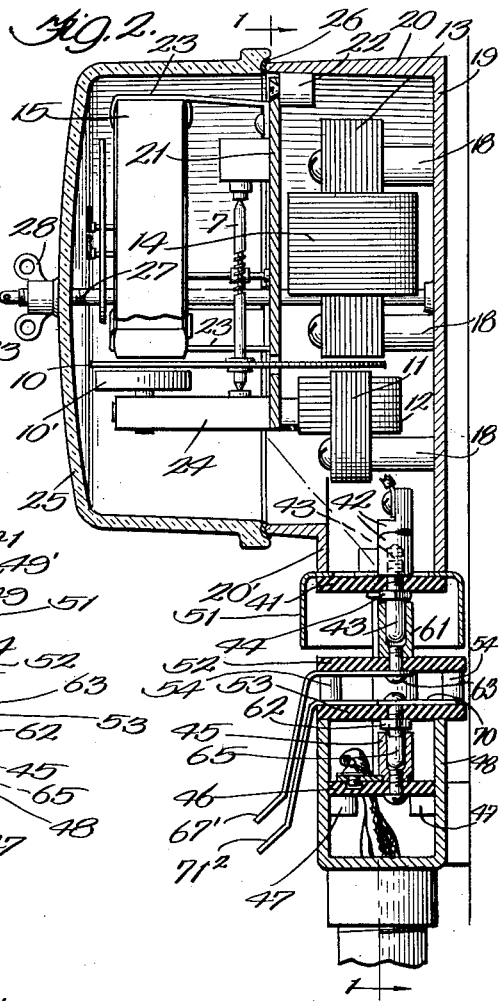
Figure 3:
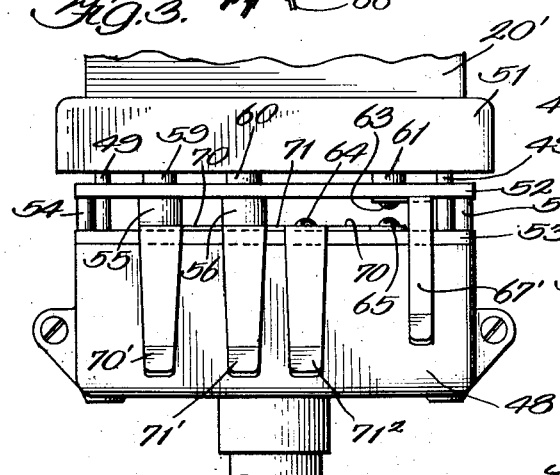
Figure 4:
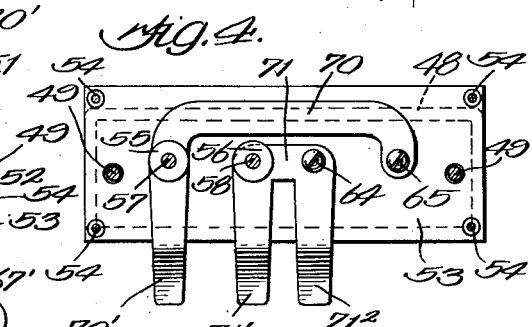

The invention will be more fully explained in connection with the accompanying drawings in which Fig. 1 is a front view illustrating a service meter, partially in section, and an adapter applied thereto to enable the service meter to be coupled with a testing meter, this figure being taken generally on line 1—1 of Fig. 2; Fig. 2 is a sectional view on line 2—2 of Fig. 1; Fig. 3 is a view in elevation of some of the parts shown in Fig. 1; Fig. 4 is a sectional view on line 4—4 of Fig. 1; Fig. 5 is a diagrammatic illustration illustrating the manner in which one embodiment of the invention may be employed; Fig. 6 is a front view of the preferred form of adapter; and Fig. 7 is a side view of the adapter shown in Fig. 6.

The service meter illustrated is an induction watt-hour meter. This meter is inclusive of an upright spindle or shaft 7 suitably held in bearings at its ends. A horizontal aluminum armature disc 10 is carried by the spindle on which the disc is rigidly secured. This disc is turned proportionately to the energy consumed by the load by a magnet system that is inclusive of a current or series magnet and a pressure or shunt magnet. The current magnet is inclusive of an E shaped core of laminated iron 11 whose middle leg is wound by a coil 12 serially included in one load circuit side. The pressure magnet is inclusive of a U shaped laminated iron core 13 whose legs are surrounded by the coils 14 which are connected in series in the same bridge between the load circuit sides. The speed of the armature of the meter is checked by the damping permanent magnet 15 which is upon one side of the disc 10, a keeper 10' being upon the other side of the disc. The meter parts illustrated and described constitute a meter motor whose armature 10 and spindle 7 turn proportionately to the wattage in a manner well known to those familiar with the art.

The cores of the current and pressure magnets are carried by posts 18 which, in turn, are carried by the upright back wall 19 of the meter casing. The arcuate wall 20 of the meter casing body projects forwardly from the meter back 19 and surrounds the magnets. This casing body is desirably formed of cast iron. An upright plate 21, of iron, constitutes a magnetic shield which is interposed between the magnet system and the damping magnet. This plate is mounted upon ears 22 that are desirably integrally cast with the meter casing body and are contained within such body. Said plate is nearly coplanar with the front edge of the meter casing. A clip structure, of which a portion 23 is shown, is carried by and upon the front face of the plate 21 and carries the damping magnet 15 in front of said plate. A post 24 is carried by and projects forwardly from the plate 21 and carries the keeper 10'. A cover 25, preferably of glass, is of cup shape, the rim of the cup being carried upon the front edge of the meter casing body, there being a packing 26 which is clamped between the cover and casing body. The means illustrated for clamping the cover in place is inclusive of two rods 27 which are mounted upon the meter back 19 and pass through the front wall of the cover 25. Wing nuts 28 are screwed upon the rods 27. Undetectable removal of the cover is guarded against by the passage of sealing wires through holes in the outer ends of the rods 37 and in the wings of the nuts 28, in accordance with common practice.

The terminal block 41 formed of insulation carries the four meter terminals 42 that are contained in the meter casing. Contact pins 43 are screwed into the terminals 42. These contact pins have polygonal flanges 44. The terminal block 41 is clamped between the terminals 42 and the flanges 44 and said terminals are, consequently, mounted upon the upper side of said terminal block. The pins 43 are normally received within the contact sleeves 45 with which the line and load circuit sides are connected as is well understood by those familiar with the art. The contact sleeves 45 are mounted upon a terminal block 46, also formed of insulation. The terminal block 46 is mounted upon the ears 47 that are cast integrally with and within the service connection box 48. The terminal block 41 is normally clamped against the rim that surrounds the open upper end of the service connection box by means of the clamping bolts 49 that are screwed into the ears $20^2$ that are cast integrally upon and within the casing continuation $20'$. Said clamping bolts are formed with shoulders $49'$ which have direct clamping engagement with the block 41. Said bolts are also provided with wing nuts not shown which are screwed upon their outer ends and force the service connection box 48 against the terminal block 41. A skirted cap 51 has its end wall clamped between the terminal block 41 and the bottom edge of the meter casing continuation $20'$. This cap end wall is formed with a large opening to permit of the clear passage of the meter terminals 42 from the terminal block 41 into the interior of the meter casing. The skirt of said cap surrounds the terminal block 41 and, normally, the top rim of the service connection box and desirably extends a considerable distance below said terminal block, whereby access of moisture to the service connection box at the upper end of this box is guarded against.

When a standardized testing meter is to be coupled with the service meter to test the accuracy of the latter the wing nuts that were screwed upon the outer ends of the rods 49 are removed and an adapter is interposed between the service connection box 48 and the terminal block 41. This adapter is inclusive of two insulating terminal blocks 52 and 53 which have spacers 54, 55 and 56 interposed therebetween. Metallic pins 57 and 58 respectively pass through the spacers 55 and 56 that are also metallic. Metallic contact sleeves 59, 60 and 61 are mounted upon the upper side of terminal block 52. The upper ends of contact pins 57 and 58 are screwed into the contact sleeves 59 and 60 to collectively clamp the blocks 52 and 53 and the spacers 55 and 56 between the contact sleeves 59 and 60 at the top of the adapter and the shoulders 62 upon said pins 57 and 58 that are below the adapter. The contact sleeve 61 is secured to the upper side of terminal block 52 by a screw 63. Two more contact pins 64 and 65 are secured to the terminal block 53.

When the adapter is inserted, following the withdrawal of the contact pins 43 from the contact sleeves 45, a circuit arrangement is established that is diagrammatically illustrated in Fig. 5. In this figure I have illustrated a standardized testing meter having parts similar to the parts of the service meter that have been described. I have applied numerals of reference to parts of the illustrated testing meter that are similar to numerals of reference that are applied to respectively similar parts of the service meter but with added prime exponents. The source of current which supplies the normal load 66 with which the service meter is normally connected is illustrated as being in the form of a secondary 67 of a transformer whose primary 68 is connected with the single phase generator 69. One terminal of the current source 67 is connected with one of the terminal sleeves 45 and the other terminal is connected with another sleeve 45 adjacent the first. The load conductors $66'$ are respectively connected with the remaining contact sleeves 45. Following the withdrawal of the contact pins 43 from the sleeves 45 and the insertion of the pins 57, 58, 64 and 65 in said sleeves the load 66 is out of circuit with the service meter winding 12, the circuit continuing function of this winding being performed by the connecting bridge or strap 70 that is mechanically and electrically coupled with the pins 57 and 65 whereby one terminal of the source 67 is connected with one side of the load. The other terminal of the source 67 is connected with the other side of the load by means of the metallic strap 71 which is mechanically and electrically connected with the pins 58 and 64. When the adapter is employed the current winding of the service meter is out of circuit until the standardized testing meter is applied, but the pressure winding of the service meter is still in bridge between the sides of the circuit that is supplied by the source 67. The pressure winding $14'$ of the testing meter is brought into parallel with the pressure winding 14 of the service meter by means of terminals in the form of clips 72 that are in the form of metallic pincers having contact jaws that are spring pressed into engagement with the continuations 70', 71' of the straps or connectors 70, 71. The current winding 12' of the testing meter is brought into series connection with the current winding 12 of the service meter by means of terminal clips 73 that are in the form of metallic pincers having contact jaws that are spring pressed into engagement with the continuations 67', 71² of the straps or connectors 67, 71. The clips 73 constitute the terminals of a testing load 74 of predetermined values, one side of the load being connected with one of these clips 73 through the intermediation of the testing meter winding 12' while the other side of this load is directly connected with the other clip 73.

When the standardized testing meter is brought into association with the service meter in the manner described and as illustrated in Fig. 5 the normal load may be continued to be supplied from the source while the artificial or special testing load 74 is also supplied from said source 67 but without being materially influenced by any fluctuations which may occur in the load 66. The testing of the service meter and adjustment of its parts to correct errors that are found therein may proceed without curtailing the operation of the normal load 66 and without depending upon this load for checking up the operation of the service meter in comparison with the testing meter.

Changes may be made without departing from the invention.

Having thus described my invention, I claim:

A unitary adapter removably interposable between an electricity service meter terminals and the terminals of the connection box of said meter for connecting the service meter to a testing meter and testing load without interrupting the normal load circuit during the testing operation, said adapter comprising upper and lower spaced insulating blocks, a circuit continuing element extending through both of said blocks, one end of which is detachably engageable with the service meter terminal which is common to the pressure and current windings of the service meter and the other end of which is detachably engageable by a terminal of the service meter connection box which is in connection with one side of the current source, a second circuit continuing element extending through both of the blocks, one end of which is detachably engageable with a service meter terminal contact having connection only with the pressure winding of the service meter and the other end of which is detachably engageable by a terminal of the service meter connection box which is in connection with the other side of the current source, a contact carried by the lower block detachably engageable by a service load terminal of the service meter connection box, a bridge connecting said contact and the second named circuit continuing element for connection at the end thereof adjacent the circuit continuing element with the pressure winding of a testing meter and for connection at the end thereof adjacent said contact with the current winding of a testing meter, a second contact carried by the upper block for connection with one side of a testing load and detachably engageable with a service meter terminal which is connected only with the current winding, a third contact carried by the lower block for detachable engagement by the service meter connection box terminal which is in connection with the other side of the service load, and a bridge connecting said second contact with the first circuit continuing element for connection at the end thereof adjacent the circuit continuing element with the pressure winding of a testing meter.

In witness whereof, I hereunto subscribe my name.

ALBERT L. EMENS.